(12) United States Patent
Harris

(10) Patent No.: US 10,216,275 B2
(45) Date of Patent: Feb. 26, 2019

(54) TOUCH AND HAPTICS DEVICE

(71) Applicant: NVF TECH LTD, Sandy, Cambridgeshire (GB)

(72) Inventor: Neil John Harris, Cambridge (GB)

(73) Assignee: NVF Tech Ltd, Cambridgeshire (GB)

( * ) Notice: Subject to any disclaimer, the term of this patent is extended or adjusted under 35 U.S.C. 154(b) by 0 days.

(21) Appl. No.: 14/389,153

(22) PCT Filed: Mar. 25, 2013

(86) PCT No.: PCT/GB2013/050774
§ 371 (c)(1),
(2) Date: Sep. 29, 2014

(87) PCT Pub. No.: WO2013/144602
PCT Pub. Date: Oct. 3, 2013

(65) Prior Publication Data
US 2015/0169058 A1    Jun. 18, 2015

(30) Foreign Application Priority Data

Mar. 30, 2012 (GB) .................................. 1205765.9

(51) Int. Cl.
*G06F 3/01* (2006.01)
*G06F 3/041* (2006.01)

(52) U.S. Cl.
CPC ............. *G06F 3/016* (2013.01); *G06F 3/041* (2013.01)

(58) Field of Classification Search
None
See application file for complete search history.

(56) References Cited

U.S. PATENT DOCUMENTS

| 4,885,565 | A | 12/1989 | Embach |
| 5,638,060 | A | 6/1997 | Kataoka et al. |
| 5,977,867 | A | 11/1999 | Blouin |
| 6,388,655 | B1 * | 5/2002 | Leung .................. G01L 1/20 341/34 |
| 2001/0006006 | A1 * | 7/2001 | Hill .................. G06F 3/0433 73/606 |
| 2002/0075135 | A1 | 6/2002 | Bown |

(Continued)

OTHER PUBLICATIONS

International Search Report for PCT/GB2013/050774, dated Apr. 7, 2013.

(Continued)

*Primary Examiner* — Matthew Yeung
(74) *Attorney, Agent, or Firm* — Fish & Richardson P.C.

(57) ABSTRACT

There is provided a method of generating a desired haptic sensation and providing a desired touch sensitivity in a touch sensitive device, the touch sensitive device comprising a touch sensitive member and at least one transducer connected to the touch sensitive member, the method comprising: processing electrical signals to be applied to one or more of said at least one transducer connected to the touch sensitive member by applying appropriate algorithms to provide the desired haptic sensation; and processing electrical signals from one or more of said at least one transducer connected to the touch sensitive member by applying the said appropriate algorithms to generate output signals to provide the desired touch sensitivity.

5 Claims, 9 Drawing Sheets

(56) References Cited

U.S. PATENT DOCUMENTS

| | | | | |
|---|---|---|---|---|
| 2003/0040361 | A1* | 2/2003 | Thorner | G06F 3/011 463/36 |
| 2005/0146513 | A1* | 7/2005 | Hill | G06F 3/043 345/173 |
| 2007/0236450 | A1* | 10/2007 | Colgate | G06F 3/016 345/156 |
| 2008/0036742 | A1* | 2/2008 | Garmon | G06F 3/0418 345/173 |
| 2008/0289887 | A1* | 11/2008 | Flint | G06F 3/0414 178/18.03 |
| 2010/0013783 | A1* | 1/2010 | St. Pierre | G06F 3/0418 345/173 |
| 2010/0231550 | A1* | 9/2010 | Cruz-Hernandez | G06F 3/016 345/174 |
| 2010/0302184 | A1* | 12/2010 | East | G06F 3/016 345/173 |
| 2010/0328053 | A1* | 12/2010 | Yeh | G06F 3/041 340/407.2 |
| 2011/0221694 | A1* | 9/2011 | Karaoguz | G06F 3/016 345/173 |
| 2012/0050230 | A1 | 3/2012 | Harris | |

OTHER PUBLICATIONS

International Preliminary Report on Patentability, issued in International Application No. PCT/GB2013/050774, dated Oct. 1, 2014, 7 pages.
Office Action issued in Chinese Application No. 201380026010.6, dated May 2, 2018, 6 pages (with English translation).

* cited by examiner

TOUCH AND HAPTICS DEVICE

TECHNICAL FIELD

This invention relates to improvements to touch sensitivity and haptic feedback, and in particular to improvements to touch sensitivity and haptic feedback within touch sensitive devices including touch sensitive screens, sensors, members or panels.

BACKGROUND ART

U.S. Pat. Nos. 4,885,565, 5,638,060, 5,977,867, US 2002/0075135 describe touch-operated apparatus having tactile feedback for a user when touched.

In U.S. Pat. No. 4,885,565 an actuator is provided for imparting motion to the CRT when the actuator is energised to provide tactile feedback.

In U.S. Pat. No. 5,638,060, a voltage is applied to a piezo-electric element which forms a switch to vibrate the element to apply a reaction force to a user's finger.

In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch.

US2002/0075135 describes the use of a second transducer to provide a pulse in the form of transient spike to simulate a button click.

BACKGROUND OF THE INVENTION

It is known that haptic feedback may be provided for a touch sensitive device, where transducers mounted or connected to a panel or member to which haptic feedback is to be provided maybe given appropriate electrical signals in order to provide a desired haptic sensation. If for example a desired haptic sensation was required to be a single sharp spike of short duration at one position on the panel or member an appropriate electrical signal would need to be applied to each transducer where the appropriate electrical signal may be different for each transducer. Appropriate electrical signals are generated through the application of appropriate algorithms. If an appropriate electrical signal generated through the application of appropriate algorithms was not used, and for example an electrical signal pulse of short duration was applied to all of the transducers coupled to the panel or member, effects such as dispersion of vibration of the panel or member, reflections within the panel or member, distortion within the transducer would in a real system generally lead to a haptic sensation that was not that desired—in such a non-desired situation the vibration at the position on the panel or member may comprise a series of vibrations rather than one single pulse, and vibration pulses may occur at different positions on the panel or member to the desired position. A transfer function exists between the electrical signal input to a transducer and the resulting haptic sensation at a position on the panel or member. To account for these distorting effects a required electrical signal to be input to the transducers such as a short duration pulse that is to be used to generate a desired haptic sensation on the panel or member such as a short duration vibration at a particular position may be transformed through the application of appropriate algorithms to generate appropriate electrical signals that are applied to the transducers in order that the desired haptic sensation at a position on the panel or member is generated. The appropriate algorithms applied to the electrical signals for each transducer to generate the appropriate electrical signals that are applied to each transducer may be different.

Similarly, touch sensitivity may be provided for a touch sensitive device, where transducers mounted or connected to a panel or member generate electrical signals due to a touch on the touch sensitive panel or member and where appropriate processing of those electrical signals is provided in order to provide desired touch sensitivity. If for example a single sharp touch spike of short duration at one position on the panel or member was required to be detected the electrical signal from each transducer would need to be processed using appropriate algorithms, where the algorithm applied to the electrical signal from each transducer may be different. If algorithms were not applied to the electrical signals generated by the transducers then effects such as dispersion of vibration waves within and on the panel or member, reflections within the panel or member, and distortion within the transducer would in a real system generally lead to a touch sensitivity that was not that desired—the detected touch may appear to have several pulses for example and may be spread out in time and otherwise be distorted, rather than that characteristic of a single sharp touch event of short duration. There is a transfer function between the touch input to the panel or member and the electrical signal coming out of or provided by a transducer. To account for these distorting effects electrical signals output from the transducers may be transformed using appropriate algorithms in order that the required touch sensitivity is generated. The appropriate algorithms applied to the electrical signal from each transducer may be different.

The application of appropriate algorithms to generate a desired haptic sensation and the application of appropriate algorithms to generate a desired touch sensitivity requires significant memory storage and processing load. This is because both haptics sensation algorithms or algorithm resources and touch sensitivity algorithms or algorithm resources must be stored or uploaded when required within or to an appropriate processor (or their defining numerical values stored or uploaded when required), and the haptics sensation algorithms and touch sensitivity algorithms must each be applied within an appropriate processor when required.

Significant work is also required to determine optimum or appropriate haptics sensation algorithms in order to generate desired haptic sensations. In comparison it is generally not as difficult to determine optimum or appropriate touch sensitivity algorithms in order to generate desired touch sensitivity because a panel or member can be touched at a known location or locations, and algorithms can be determined that generate a touch sensitivity corresponding to a touch having occurred at that known location or locations. Conversely, for the determination of optimum or appropriate algorithms to generate a haptic sensation, a process such as an iterative optimisation process may generally need to be used in order to determine the optimum or appropriate algorithms because there is generally no starting input that can be made to correspond to the desired output haptic sensation.

There is also a problem for a touch sensitive device that has touch sensitivity and haptic feedback, where different users interacting with the device may lead to different and or incorrect results. For example touch sensitivity provided by the touch sensitive device may be different for different users, and/or haptic sensations provided by the touch sensitive device may be interpreted differently by the different users. These effects could lead to incorrect operation of the device in terms of touches on the touch sensitive member that are interpreted incorrectly by the touch sensitive device and/or to haptic feedback that is incorrectly interpreted by the user. For example, one person may have better fingertip sensory perception than another person, and a haptic sensation presented to the first person may be clearly discernible whilst the same haptic sensation presented to the second person may not be perceived at all, or be perceived ambiguously. This difference in user interaction may also apply to touch sensitivity within a touch sensitive device, where different users interacting with that device may lead to incorrect behaviour in the device. For example if a touch sensitive device was anticipating or requiring that a short duration touch be made on the touch panel or member by a user, one person may touch the panel or member in a manner anticipated or required by the touch sensitive device and the touch sensitive device could accordingly correctly process the touch. However, another person, because of reduced fingertip touch sensitivity, fingertip sensory perception and or reduced reflex or movement capabilities, may touch the panel or member for a duration that is longer than anticipated or required or otherwise different to that anticipated or required and this may lead to the touch sensitive device incorrectly processing the touch.

The present invention was made in an attempt to solve these problems.

SUMMARY OF THE INVENTION

The applicant's research has shown that the appropriate algorithm (or algorithms) applied to an electrical signal or signals to generate an appropriate electrical signal or signals for input to a transducer or transducers to provide a desired haptic sensation may be the same appropriate algorithm (or algorithms) applied to an electrical signal or signals output from a transducer or transducers to provide a desired touch sensitivity in the touch sensitive device.

According to one aspect of the invention there is provided a method of generating a desired haptic sensation and providing a desired touch sensitivity in a touch sensitive device, the touch sensitive device comprising a touch sensitive member and at least one transducer connected to the touch sensitive member, the method comprising: processing electrical signals to be applied to one or more of said at least one transducer connected to the touch sensitive member by applying appropriate algorithms to provide the desired haptic sensation; and processing electrical signals from one or more of said at least one transducer connected to the touch sensitive member by applying the said appropriate algorithms to generate output signals to provide the desired touch sensitivity.

According to another aspect of the invention, there is provided the above method further comprising determining appropriate algorithms to be applied to the electrical signals from the one or more of said at least one transducer to generate output electrical signals to provide a desired touch sensitivity, wherein the determined appropriate algorithms are used as the said appropriate algorithms applied to the electrical signals to be applied to one or more of said at least one transducer to provide the desired haptic sensation.

According to another aspect of the invention there is provided a touch sensitive device comprising: a touch sensitive member, at least one transducer connected to the touch sensitive member, and a processor configured to carry out the above methods.

According to another aspect of the invention there is provided a computer program comprising program code which, when executed on a processor of a touch sensitive device, will cause the touch sensitive device to carry out the above methods.

According to another aspect of the invention there is provided a method of determining appropriate algorithms for generating a desired haptic sensation in a touch sensitive device, the touch sensitive device comprising a touch sensitive member and at least one transducer connected to the touch sensitive member, the method comprising: determining appropriate algorithms to be applied to electrical signals from one or more of said at least one transducer to generate output electrical signals to provide a desired touch sensitivity; wherein the said appropriate algorithms to be applied to the electrical signals from the said one or more of said at least one transducer to generate output electrical signals to provide the desired touch sensitivity are used as the said appropriate algorithms for generating the desired haptic sensation.

According to another aspect of the invention there is provided a method of generating a desired haptic sensation and providing a desired touch sensitivity in a touch sensitive device, the touch sensitive device comprising a touch sensitive member and at least one transducer connected to the touch sensitive member, the method comprising: processing electrical signals to be applied to one or more of said at least one transducer connected to the touch sensitive member by applying appropriate algorithms to provide the desired haptic sensation; and processing electrical signals from one or more of said at least one transducer connected to the touch sensitive member by applying appropriate algorithms to generate output signals to provide the desired touch sensitivity; wherein the said appropriate algorithms to provide the desired haptic sensation correspond to the said appropriate algorithms to provide the desired touch sensitivity subject to a scaling factor.

BRIEF DESCRIPTION OF DRAWINGS

The prior art is diagrammatically illustrated and the invention is diagrammatically illustrated, by way of example, in the accompanying drawings in which.

DETAILED DESCRIPTION OF DRAWINGS

In making the present invention it has been determined that the application of appropriate algorithms or the provision of appropriate algorithm resources to provide both a required or desired haptic sensation and a required or desired touch sensitivity is complex, and requires significant systems resources, such as processing power and memory storage. Furthermore it has been determined that the generation of appropriate algorithms or algorithm resources to provide a required or desired haptic sensation can be complex, and potentially very difficult. Furthermore it has been determined that the required or desired touch sensitivity and the required or desired haptic sensation may be user dependent, which may require the generation of bespoke or user specific appropriate algorithms or algorithm resources.

The applicant has conducted research into the generation of vibrations within a touch sensitive member and the detection of vibrations within a touch sensitive member. The applicant's research has led to the development of methods for the generation of appropriate algorithms or algorithm resources for the provision of the desired haptic sensation and for the generation of the desired touch sensitivity that may require less systems resources in order to be implemented. The applicant's research has also led to the development of a method for generating appropriate algorithms or algorithm resources for the generation of the desired haptic sensation that may be less complex and may be less difficult than known methods.

Figure 1:
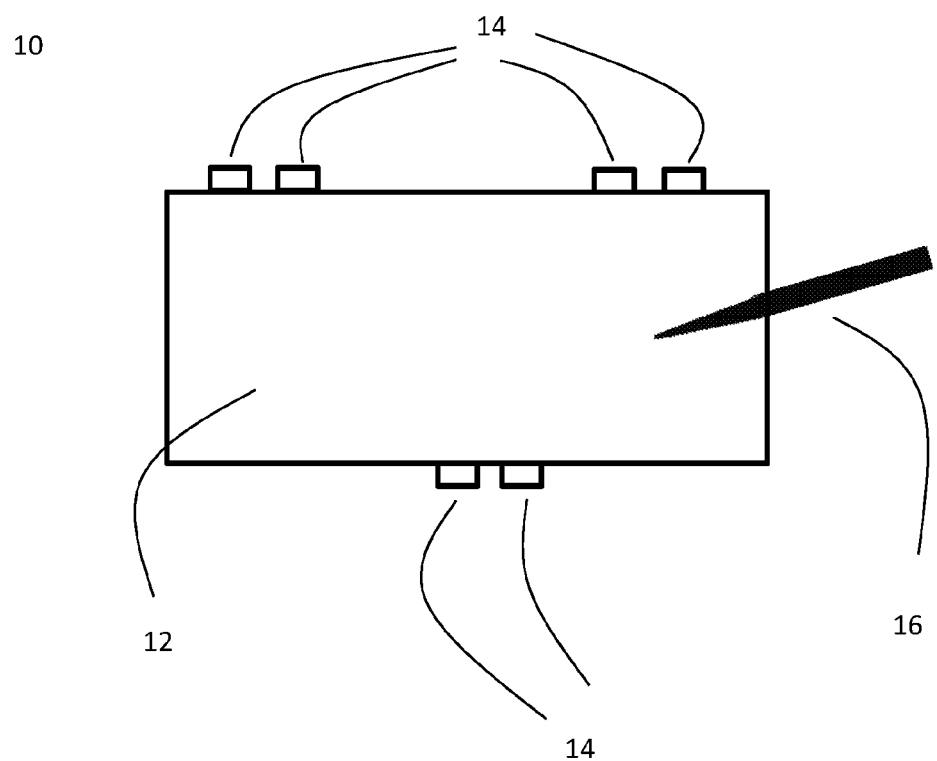
FIG. 1 shows a schematic diagram of a touch sensitive device, comprising a member or panel to which are mounted or connected a plurality of transducers, with a stylus provided to touch the member or panel, shown in plan profile.

FIG. 1 shows a touch sensitive device 10 according to an aspect of the invention, comprising a touch sensitive panel or member 12. The touch sensitive member 12 supports vibrations, such as bending wave vibrations or surface acoustic waves. The touch sensitive member 12 has a number of actuators, transducers or exciters 14 attached, coupled, connected or mounted to it, which are able to vibrate the touch sensitive member 12 in response to applied electrical signals in order to provide a haptics sensation, and which are able to couple vibrations from the touch sensitive member 12 and produce corresponding output electrical signals in order to provide touch sensitivity.

A stylus 16 can he used to touch the touch sensitive member 12. The stylus 16 is able to generate a touch signal in the touch sensitive device 10 by coupling vibrational energy to the touch sensitive member 12 from which touch sensitivity may be provided, and is able to detect vibrations from the touch sensitive device 10 by coupling vibrational energy from the touch sensitive member 12 by which the haptics sensation may be provided. The touch signal can be processed to provide the desired touch sensitivity. The haptics response feedback can comprise the desired haptic sensation. The stylus 16 includes without limitation a finger or fingers, or any other means of providing a touch signal to and/or detecting haptics response feedback from the touch sensitive member 12 of the touch sensitive device 10. A touch signal includes without limitation a simple touch at one position on the touch sensitive member, a touch describing a line or curve across the touch sensitive member, a 'simultaneous', substantially simultaneous or delayed touch at more than one position on the touch sensitive member, 'gesture' information such as the moving apart or moving together or rotation of two fingers on the touch sensitive member, or other touch signals known in the art.

The person skilled in the art will appreciate that a touch signal could be provided to the touch sensitive member without actually touching it with the stylus 16, for example due to the transmission of air pressure waves to the member 12 and due to movement of the stylus 16 near to the touch sensitive member 12. Furthermore, the person skilled in the art will appreciate that vibrations from the touch sensitive member could be detected by a stylus 16 that is not initially in contact with the touch sensitive member 12 of the touch sensitive device 10, for example, if the stylus 16 was in very close proximity to the touch sensitive member 12 but not touching the member 12, the haptic sensation could still be detected due to movement of the stylus 16 that leads to movement of the touch sensitive member 12 that is being touched by the stylus 16. The person skilled in the art will also appreciate that haptics response feedback could be detected in a non-contact means, for example by a stylus 16 that detects air pressure waves resulting from movement of the touch sensitive member 12, or other non-contact means known in the art.

In the embodiment discussed above all of the one or more exciters or transducers 14 coupled to the touch sensitive sensor or member 12 are able to couple vibrational energy from the touch sensitive sensor or member 12. However, in alternative embodiments one, some, or all of the exciters or transducers 14 may be used to couple vibrational energy from the touch sensitive sensor or member 12. Further, the exciters or transducers may have electrical signals applied to one, some or all of the exciters or transducers to couple vibrational energy to, or generate vibration within, the touch sensitive member to provide haptics response feedback. Further, not all the exciters or transducers 14 attached, coupled, connected or mounted to the touch sensitive member need to be used to provide the desired touch sensitivity or desired haptic sensation. The number, and/or identities, of the exciters or transducers used may be different on different occasions, depending upon what touch sensitivity or haptics response feedback is desired.

The exciters or transducers may be common, in that the same (or some of the same) transducers or exciters are used both to couple vibrational energy from and to the touch sensitive panel or member. In embodiments where separate exciters or transducers are used to couple vibrational energy from the touch sensitive panel or member and to couple vibrational energy to, or generate vibration within and or on, the touch sensitive panel or member the exciters or transducers used to couple vibrational energy from the touch sensitive panel or member may be the same type of exciters or transducers used to couple vibrational energy to the touch sensitive sensor or member. Alternatively, where separate exciters or transducers are used to couple vibrational energy from the touch sensitive panel or member and to couple vibrational energy to, or generate vibration within, the touch sensitive panel or member the exciters or transducers used to couple vibrational energy from the touch sensitive sensor or member may be a different type of exciters or transducers used to couple vibrational energy to the touch sensitive panel or member.

An exciter or transducer 14 used to couple vibrational energy from the touch sensitive member 12 can be attached, coupled, connected or mounted to the touch sensitive member 12 at a location close to or adjacent to an exciter or transducer 14 used to couple vibrational energy to the touch sensitive member. The person skilled in the art will appreciate that under certain approximations two exciters or transducers 14 located close to or adjacent to one another may be considered to be located at an equivalent position or location on the touch sensitive member 12, for example when the size of the touch sensitive member 12 becomes relatively large and/or the size of the exciters or transducers 12 becomes relatively small, in order that the exciters or transducers 14 are relatively small in size compared to the size of the touch sensitive member 12.

Vibrational energy includes surface acoustic vibrations and bending wave vibrations. The touch sensitive panel or member may support the propagation of vibrations that includes surface acoustic vibrations and/or bending wave vibrations.

The touch sensitive device may comprise an electronic visual display.

Figure 2A:
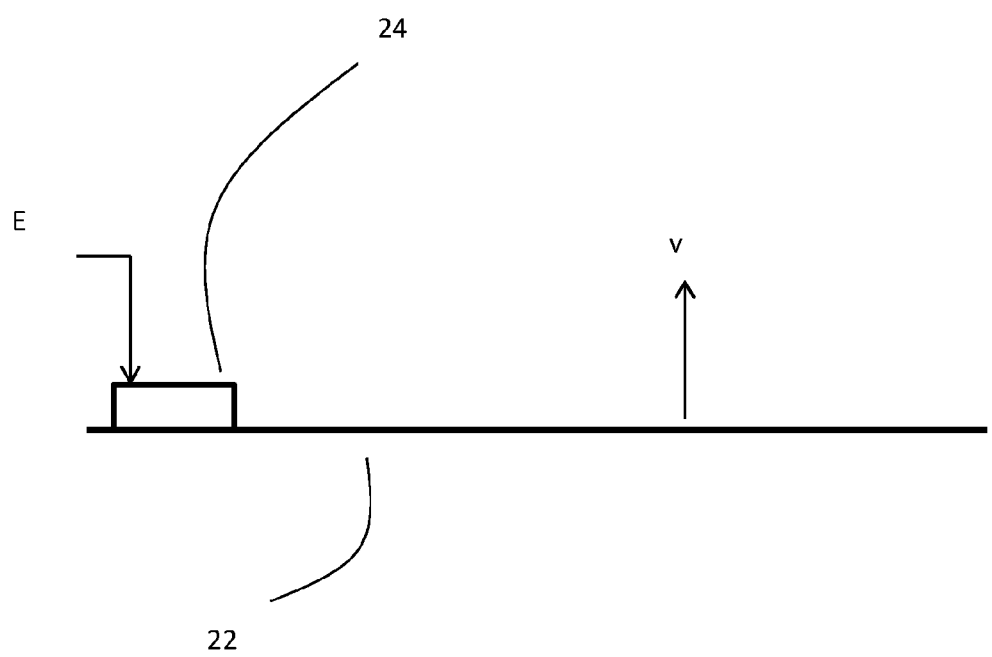
FIG. 2a shows a schematic of a touch sensitive device, comprising a member or panel to which are mounted or connected a plurality of transducers to provide a haptic sensation, shown in side profile.

FIG. 2a shows an idealised touch sensitive device 20, comprising a touch sensitive panel or member 22. The touch sensitive member 22 supports vibrations, such as bending wave vibrations or surface acoustic waves. The touch sensitive member 22 has a number of actuators, transducers or exciters 24 attached, coupled, connected or mounted to it. A transducer 24 is shown. In some examples the transducer 24 may be a piezoelectric device, which is driven by a voltage E to generate vibrations within and or on the touch sensitive member 22 that leads to movement of the touch sensitive member at a particular position with a velocity v of the touch sensitive member at that position.

An admittance transfer matrix (or Y parameter matrix) may be used to map the relationship between the inputs and outputs for a two port network, such admittance transfer matrices are frequently used to describe electrical circuits. For example if there are two inputs $A_1$ and $A_2$, within a two port network leading to two outputs $B_1$ and $B_2$, then their relationship can be written as:

$$\begin{pmatrix} B_1 \\ B_2 \end{pmatrix} = \begin{pmatrix} Y_{11} & Y_{12} \\ Y_{21} & Y_{22} \end{pmatrix} \begin{pmatrix} A_1 \\ A_2 \end{pmatrix}$$

Where the matrix elements are given by:

$$Y_{11} = \frac{B_1}{A_1}\bigg|_{A_2=0} \quad Y_{12} = \frac{B_1}{A_2}\bigg|_{A_1=0}$$

$$Y_{21} = \frac{B_2}{A_1}\bigg|_{A_2=0} \quad Y_{22} = \frac{B_2}{A_2}\bigg|_{A_1=0}$$

For the theoretically ideal situation relating to the touch sensitive device shown in FIG. 2a, a voltage E applied to the transducer such as a piezoelectric device leads to a current flow i, and due to the transducer 24 vibrating the touch sensitive member 22 this also leads to a resultant velocity v generated at a location on the touch sensitive member 22. The situation is considered to be theoretically ideal because there is no impedance to movement of the touch sensitive member 22 that would result from a finger or stylus touching the touch sensitive member to pick up the movement of the touch sensitive member 22, or even any impedance caused by air resistance around the touch sensitive member 22. In this idealised situation, an admittance transfer matrix can be written as:

$$\begin{pmatrix} i \\ v \end{pmatrix} = \begin{pmatrix} Y_{11} & Y_{12} \\ Y_{21} & Y_{22} \end{pmatrix} \begin{pmatrix} E \\ 0 \end{pmatrix}$$

Figure 2B:
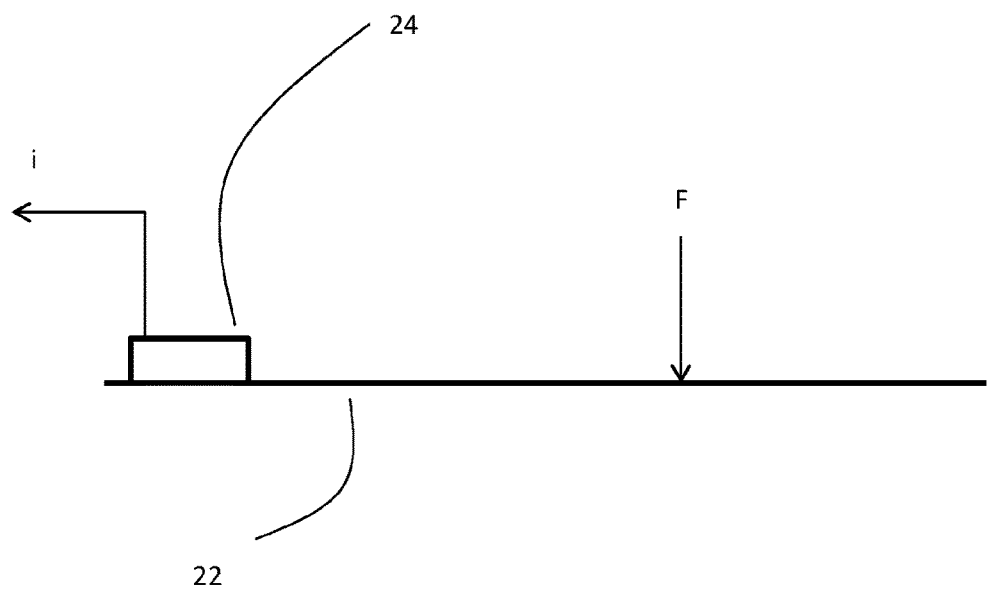
FIG. 2b shows a schematic of a touch sensitive device, comprising a member or panel to which are mounted or connected a plurality of transducers to provide a touch sensitivity, shown in side profile.

FIG. 2b shows the idealised situation for a touch sensitive device 20 as shown in FIG. 2a. The touch sensitive member 22 is being perturbed by a force F, which leads to the touch sensitive member 22 at the location of the force having a velocity v. Acoustic vibrations are coupled to the transducer 24, which again may be a piezoelectric device, which generates a current i.

For the theoretically ideal situation relating to the touch sensitive device shown in FIG. 2b, again the situation is a theoretical ideal because a force has been applied to the touch sensitive member 22 without actually touching it, because there is no associated impedance being applied to the touch sensitive member 22 that would occur if a finger of stylus was touching the touch sensitive member 22 in order to apply the force. The equivalent admittance transfer matrix can be constructed for the sensing case in a similar way to the generation of vibrations case shown in FIG. 2a, and this can be written as:

$$\begin{pmatrix} i \\ v \end{pmatrix} = \begin{pmatrix} Y_{11} & Y_{12} \\ Y_{21} & Y_{22} \end{pmatrix} \begin{pmatrix} 0 \\ F \end{pmatrix}$$

For generating vibrations within and or on the touch sensitive member 22 as shown in FIG. 2a, the touch sensitive member velocity and driving voltage have the following relationship:

$$v = Y_{21} E$$

For detecting a vibration within and or on the touch sensitive member as shown in FIG. 2b, the transducer current and force applied to the touch sensitive member have the following relationship:

$$i = Y_{12} F$$

Some systems show reciprocal behaviour, for example in electromagnetism where antennas should work equally well in respect to operating as receivers and operating as transmitters. The emitted and receiving radiation patterns are also equivalent in such a situation. For systems that are reciprocal, the following holds for admittance transfer function elements defining two port networks:

$$Y_{21} = Y_{12}$$

Therefore, assuming generating vibrations within and or on a touch sensitive member as shown in FIG. 2a and detecting a touch signal as shown in FIG. 2b are reciprocal, the following relationship applies:

$$\frac{F}{i} = \frac{E}{v}$$

This means that, in theory for an ideal situation, for a touch sensitive member having vibrations generated within and or on it by a piezoelectric transducer or exciter and having vibrations detected by a piezoelectric transducer, the transfer function between the force F applied at a position on the touch sensitive member and the current i flowing from the transducer, due to detecting the vibrations resulting from the application of that force, is the same as the transfer function between the voltage E applied to the transducer or exciter to generate vibrations within and or on the panel or member and the velocity v of the panel or member at the position on the panel or member. This means that the input transfer function and output transfer functions may be the same.

Figure 3A:
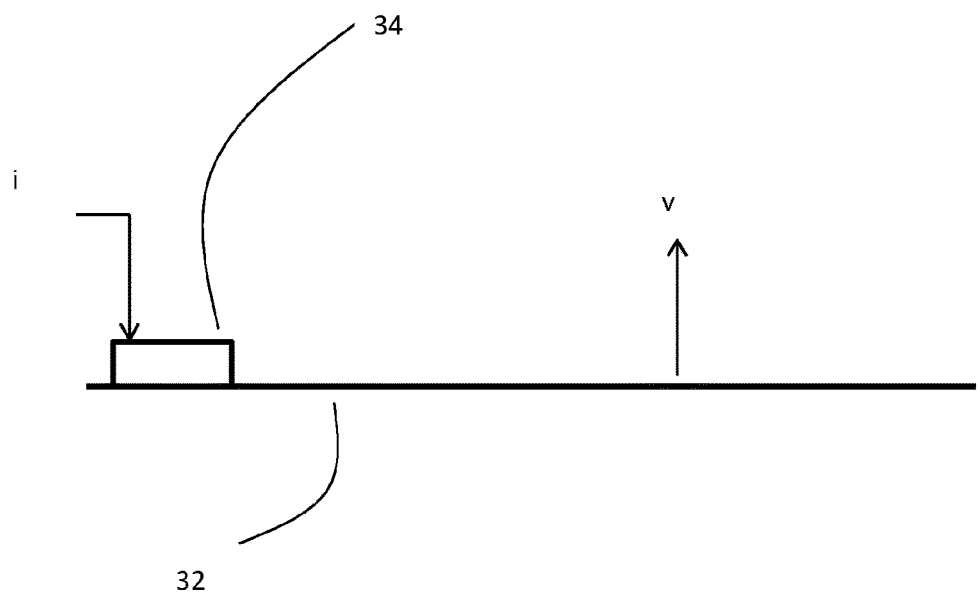
FIG. 3a shows a schematic of a touch sensitive device, comprising a member or panel to which are mounted or connected a plurality of transducers to provide a haptic sensation, shown in side profile.

FIG. 3a shows the idealised touch sensitive device 30, comprising a touch sensitive panel or member 32. However, in the illustrated example of FIG. 3a the transducer or exciter is a device such as a moving coil electromagnetic transducer 34. This transducer 34 is driven by a current i to generate vibration within and or on the touch sensitive member 32 and leads to the generation of a voltage drop E across the transducer 34 and to the coupling of vibrations to the touch sensitive member 32 and to movement having a velocity v of the touch sensitive member 32 at a particular position of the touch sensitive member 32.

For the theoretically ideal situation relating to the touch sensitive device 30 shown in FIG. 3a, again no impedance is being applied to the touch sensitive member similarly to the situation discussed above in relation to FIGS. 2a and 2b. Accordingly, an admittance transfer matrix can be written as:

$$\begin{pmatrix} E \\ v \end{pmatrix} = \begin{pmatrix} Y_{11} & Y_{12} \\ Y_{21} & Y_{22} \end{pmatrix} \begin{pmatrix} i \\ 0 \end{pmatrix}$$

Figure 3B:
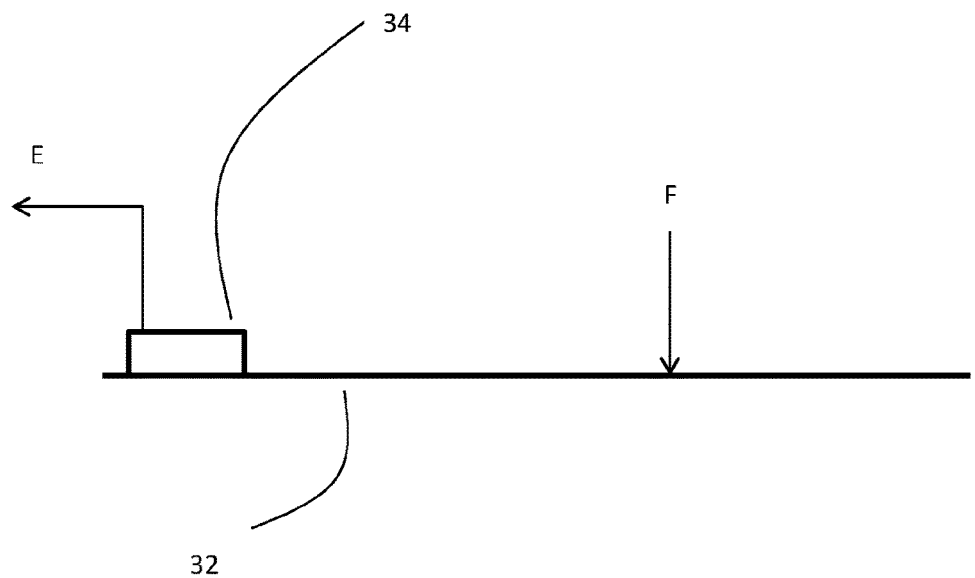
FIG. 3b shows a schematic of a touch sensitive device, comprising a member or panel to which are mounted or connected a plurality of transducers to provide a touch sensitivity, shown in side profile.

FIG. 3b shows the idealised touch sensitive device 30 as shown in FIG. 3a. The touch sensitive member 32 is being perturbed by a force F, which leads to the touch sensitive member 32 at the location of the force being characterised by a velocity v. Acoustic vibrations are coupled to the transducer, which in the illustrated example is a moving coil electromagnetic transducer 34, which generates a measureable voltage E.

For the theoretically ideal situation relating to the touch sensitive device 30 shown in FIG. 3b, again no impedance is being applied to the touch sensitive member 32, similarly to the situation discussed above in relation to FIGS. 2a and 2b. The equivalent admittance transfer matrix that was constructed for the generation of vibrations situation shown in FIG. 3a can be written for the detecting case shown in FIG. 3b as:

$$\begin{pmatrix} E \\ v \end{pmatrix} = \begin{pmatrix} Y_{11} & Y_{12} \\ Y_{21} & Y_{22} \end{pmatrix} \begin{pmatrix} 0 \\ F \end{pmatrix}$$

For generating vibrations within and or on the touch sensitive member 32 as shown in FIG. 3a, the touch sensitive member velocity and transducer driving current have the following relationship:

$$v = Y_{21} i$$

For detecting a vibration within and or on the touch sensitive member 32 as shown in FIG. 3b, the measured transducer voltage and force applied to the touch sensitive member 32, have the following relationship:

$$i = Y_{12} F$$

Again assuming the system to be reciprocal, the following relationship holds:

$$\frac{F}{E} = \frac{i}{v}$$

This means that, in theory for an ideal situation, for a touch sensitive member having vibrations generated within and or on it by a moving coil electromagnetic transducer or exciter and having vibrations detected by a moving coil electromagnetic transducer the transfer function between the force F applied at a position on the touch sensitive member and the voltage E generated across the transducer that results from detecting the vibrations resulting from the application of that force is the same as the transfer function between the current i applied to the transducer or exciter to generate vibrations within and or on the panel or member and the velocity v of the panel or member at the position on the panel or member. This means that the input transfer function and output transfer functions can be the same, even though the input transfer function and the output transfer function describe the relationship between different parameters of the touch sensitive member and transducer.

This is again rather surprising, and means that in an ideal situation, because the transfer function that applies in exciting a touch sensitive panel or member is the same as the transfer function that applies in detecting vibrations in the panel or member, and that the form of these transfer functions is effectively independent of the specific exciters or transducers used, the exciters or transducers used to excite vibrations in a touch sensitive member could be different to those that are used to detect vibrations in a panel or member and in this case the input and output transfer functions may have the same form and be related by a scaling factor. The applicant has conducted research to understand how this ideal behaviour for piezoelectric and moving coil electromagnetic transducers can be made to apply to real systems.

Figure 4A:
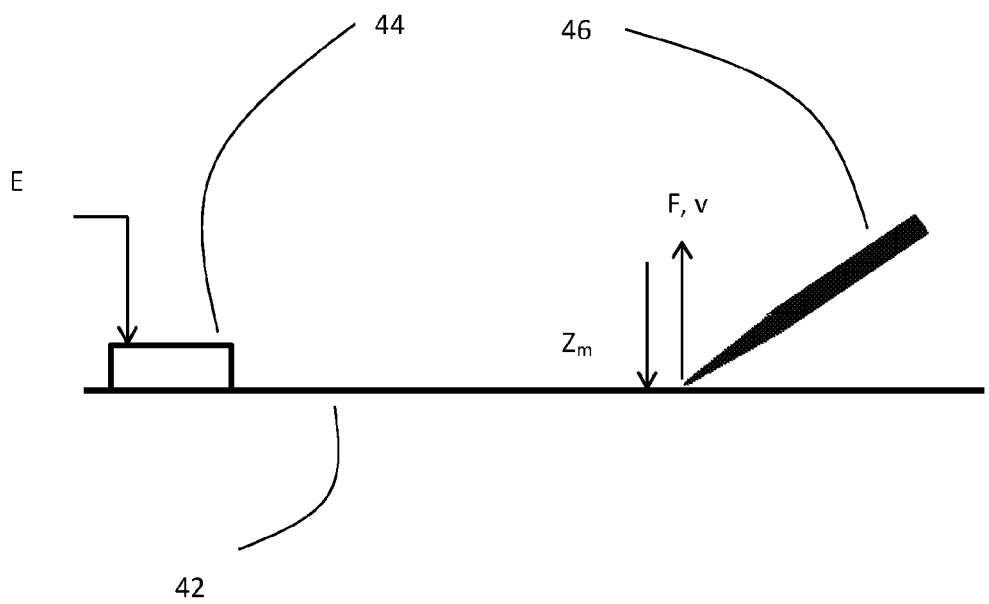
FIG. 4a shows a schematic of a touch sensitive device, comprising a member or panel to which are mounted or connected a plurality of transducers to provide a haptic sensation when the member or panel is being touched by a stylus, shown in side profile.

FIG. 4a shows a 'real' touch sensitive device 40 according to an aspect of the invention, comprising a touch sensitive panel or member 42. The touch sensitive member 42 supports vibrations, such as bending wave vibrations or surface acoustic waves. The touch sensitive member 42 has a number of actuators, transducers or exciters attached, coupled, connected or mounted to it. A transducer or exciter such as a piezoelectric transducer 44 is shown, which is driven by a voltage E to generate vibration within and or on the touch sensitive member 42 and that leads to movement having a velocity v of the touch sensitive member 42 at a particular position on the touch sensitive member 42. The device 40 is considered to be 'real' because a stylus 46 is provided that is touching the touch sensitive sensor or member 42 to detect the vibrations at the particular position having a velocity v of the touch sensitive member 42. Accordingly, an impedance $Z_m$ is being applied to the touch sensitive sensor or member 42 that is impeding its movement. This impedance $Z_m$ results from the stylus 46 touching the touch sensitive sensor or member 42. The impedance $Z_m$ also results from other impeding influences that may include resistance to movement caused by the air surrounding the touch sensitive sensor or member 42. A force F is being applied to the stylus 46 by the touch sensitive sensor or member 42 because the touch sensitive member 42 is vibrating and in doing so may push against the stylus 46.

Following the analysis that was conducted for the ideal situation, for this 'real' case an admittance transfer matrix can he written as:

$$\begin{pmatrix} i \\ v \end{pmatrix} = \begin{pmatrix} Y_{11} & Y_{12} \\ Y_{21} & Y_{22} \end{pmatrix} \begin{pmatrix} E \\ F \end{pmatrix}$$

and $$F = Z_m v$$

Figure 4B:
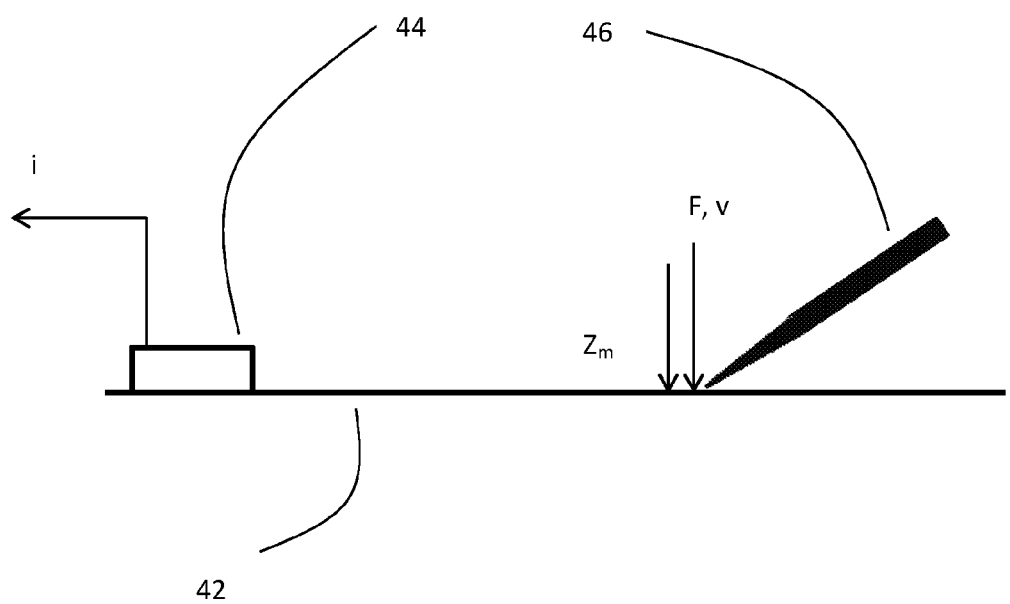
FIG. 4b shows a schematic of a touch sensitive device, comprising a member or panel to which are mounted or connected a plurality of transducers to provide a touch sensitivity when the member or panel is being touched by a stylus, shown in side profile.

FIG. 4b shows a 'real' touch sensitive device 40 as shown in FIG. 4a according to an aspect of the invention. In FIG. 4b, a stylus 46 is provided that is touching the touch sensitive panel or member 42 at a position to generate vibrations within and or on it and an impedance $Z_m$ is being applied to the touch sensitive panel or member 42 in a similar manner as discussed above in relation to the description accompanying FIG. 4a. A force F is being applied by the stylus 46 to the touch sensitive panel or member 42 to generate the vibrations leading to the touch sensitive member 42 having a velocity v. Acoustic vibrations are coupled to the piezoelectric transducer 44, which generates a current i.

Following the analysis that was conducted above, according to an aspect of the invention an admittance transfer matrix can be written as:

$$\begin{pmatrix} i \\ v \end{pmatrix} = \begin{pmatrix} Y_{11} & Y_{12} \\ Y_{21} & Y_{22} \end{pmatrix} \begin{pmatrix} 0 \\ F \end{pmatrix}$$

and $$F = Z_m v$$

For generating vibrations within and or on the panel or member as shown in FIG. 4a, the velocity of the touch sensitive member 42 at a position on the touch sensitive member, driving voltage, and force applied to the stylus at the position on the touch sensitive member have the following relationship:

$$v = Y_{21}E + Y_{22}F = Y_{21}E + Y_{22}Z_m v$$

rearranging we obtain $$v = \frac{Y_{21}}{1 - Y_{22}Z_m} E$$

For detecting the vibrations within and or on the touch sensitive panel or member 42 as shown in FIG. 4b, the transducer current and force applied to the touch sensitive panel or member 12 have the following relationship:

$$i = Y_{12}F$$

Assuming that reciprocity holds, i.e., that $Y_{21}=Y_{12}$ substitution and rearrangement leads to:

$$\frac{F}{i} = \frac{1}{(1 - Y_{22}Z_m)} \frac{E}{v}$$

From the above equation it would appear that the reciprocal behaviour identified in the ideal situation does not actually hold in the real situation when an impedance is being applied to the touch sensitive member. In the illustrated example this impedance is due to a stylus being used to generate vibrations within and/or on the touch sensitive member, or due to a stylus being used to detect vibrations within and/or on the touch sensitive member. This is because of the term $(1-Y_{22}Z_m)$ in the denominator, which at first sight appears to indicate that the transfer function between the force F applied at a position on the touch sensitive member and the current i flowing from the transducer, due to detecting the vibrations resulting from the application of that force, is not the same as the transfer function between the voltage E applied to the transducer or exciter to generate vibrations within and or on the panel or member and the velocity v of the panel or member at the position on the panel or member.

However, the matrix element $Y_{22}$ is given by:

$$Y_{22} = \frac{F}{v} \bigg|_{E=0}$$

and is not a function of the exciter or transducer, such as the illustrated piezoelectric transducer 44. Accordingly, the factor $$\frac{1}{1 - Y_{22}Z_m}$$

is a constant for a touch sensitive device 10 comprising piezoelectric transducers or exciters, where a probe or stylus is applying or receiving a particular force F to or from a touch sensitive panel or member, with an associated particular impedance Zm that is being applied to the touch sensitive panel or member.

This means that, for this real situation, for a touch sensitive member having vibrations coupled to it by a piezoelectric exciter or transducer and having vibrations detected by a piezoelectric exciter or transducer, the input transfer function and output transfer function have the same form and are related by a constant scaling factor between them, so that they may in many ways effectively be considered to be the same, even though the input transfer function and the output transfer function describe the relationship between different parameters of the touch sensitive member and different transducers.

This is again rather surprising, and means that in this real situation according to an aspect of the invention because the transfer function that applies in generating vibrations within and/or on a touch sensitive member is related to the transfer function that applies in detecting vibrations within and/or on the touch sensitive member by a constant scaling factor dependent on the piezoelectric exciters or transducers used, the piezoelectric exciters or transducers used to excite vibrations within and/or on a touch sensitive member may be different to those that are used to detect vibrations within and/or on a touch sensitive member and the input and output transfer functions may be the same except for a scaling factor, even though the input transfer function and the output transfer function describe the relationship between different parameters of the touch sensitive member and different transducers.

Figure 5A:
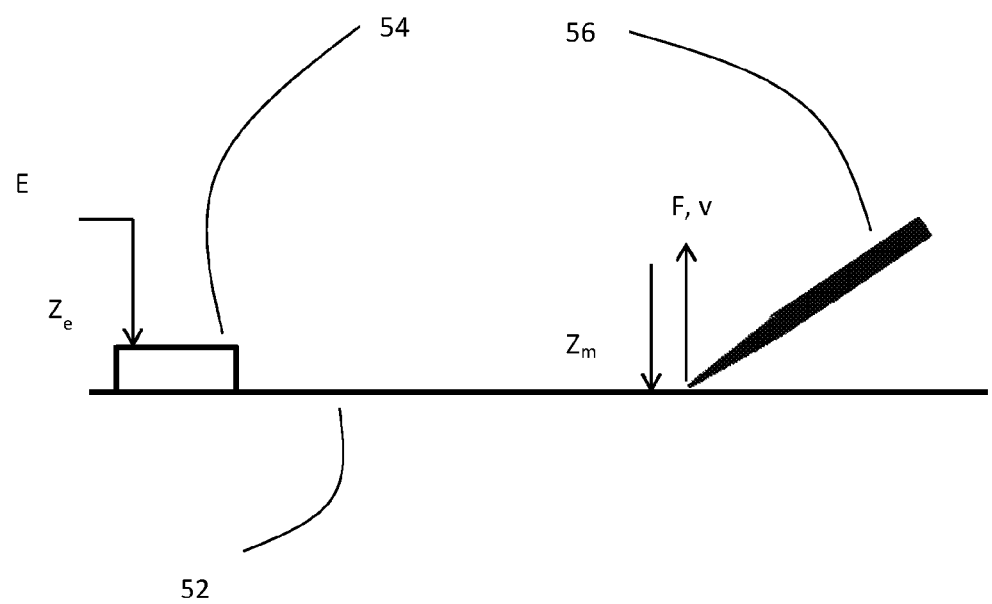
FIG. 5a shows a schematic of a touch sensitive device, comprising a member or panel to which are mounted or connected a plurality of transducers to provide a haptic sensation when the member or panel is being touched by a stylus, shown in side profile.

FIG. 5a shows a 'real' touch sensitive device 50 according to an aspect of the invention, comprising a touch sensitive panel or member 52. The touch sensitive device is operating in the manner described above in the detailed description relating to the embodiment as shown in FIG. 4a, except that a transducer or exciter such as a moving coil electromagnetic device, in this example a moving coil electromagnetic transducer 54 is shown. Such a transducer 54 may have an internal impedance $Z_e$ and a voltage E is applied across the transducer 54 to provide a driving current i for the transducer. Vibrations within and/or on the touch sensitive member are detected by a stylus as described in the embodiment as shown in FIG. 4a.

Figure 5B:
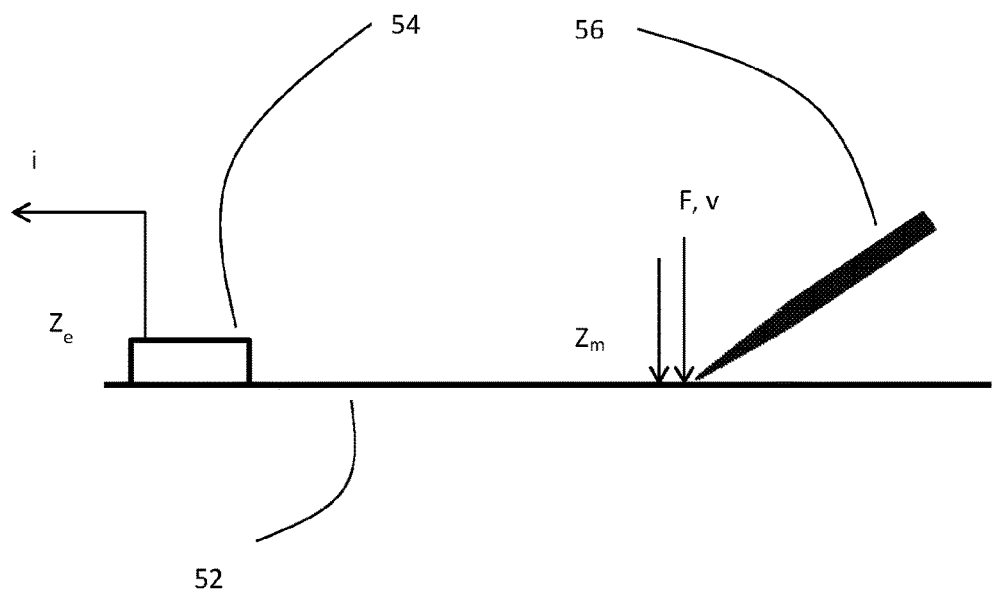
FIG. 5b shows a schematic of a touch sensitive device, comprising a member or panel to which are mounted or connected a plurality of transducers to provide a touch sensitivity when the member or panel is being touched by a stylus, shown in side profile.

In FIG. 5b according to an aspect of the invention, the real device 50 shown in FIG. 5a is shown detecting a vibration within and or on the touch sensitive member, where the current i generated at the transducer may lead to a measureable voltage drop E.

For the real situation shown in FIGS. 5a and 5b, the same admittance transfer function matrix applies for both generating and detecting vibrations, and can be written as:

$$\begin{pmatrix} E \\ v \end{pmatrix} = \begin{pmatrix} Y_{11} & Y_{12} \\ Y_{21} & Y_{22} \end{pmatrix} \begin{pmatrix} i \\ F \end{pmatrix}$$

and $$F = Z_m v$$

$$E = Z_e i$$

For generating vibrations within and or on the panel or member 52 as shown in FIG. 5a, the velocity of the panel or member 52 at a particular position on the panel or member 52, driving voltage and force applied to the stylus at the position on the panel or member 52 have the following relationship:

$$v = Y_{21}i + Y_{22}F = Y_{21}E/Z_e + Y_{22}Z_m v$$

rearranging we obtain $$v = \frac{Y_{21}}{(1 - Y_{22}Z_m)} \frac{E}{Z_e}$$

or $$Y_{21} = \frac{(1 - Y_{22}Z_m)v}{Y_{21}} \frac{Z_e}{E}$$

For detecting the vibrations on the panel or member 52 as shown in FIG. 5b, the measured voltage, transducer current and force applied to the panel or member 52 have the following relationship:

$$E = Y_{11}i + Y_{12}F$$

The relationship between the voltage drop E, current i and internal impedance of the transducer is described above, and inserting this into the above equation and rearranging results in the following:

$$i = \frac{Y_{12}}{Z_e - Y_{11}} F$$

or $$\frac{F}{i} = \frac{Z_e - Y_{11}}{Y_{12}}$$

Assuming that reciprocity holds, i.e., that $Y_{21} = Y_{12}$ upon substituting for $Y_{21}$ as given above finally results in:

$$\frac{F}{i} = \frac{Z_e - Y_{11}}{(1 - Y_{22}Z_m)} \frac{E}{v}$$

From the above equation it would again appear that the reciprocal behaviour identified in the ideal situation does not actually hold in the real situation where moving coil electromagnetic exciters or transducers are used to generate vibrations within and/or on a panel or member and moving coil electromagnetic exciters or transducers are used to detect vibrations within and/or on a panel or member, and where an impedance is being applied to the panel or member.

However, in a similar manner to that explained above it can be shown that in certain circumstances the input transfer function and output transfer function may have a constant of proportionality, or scaling factor, between them. It is to be noted that the matrix element $Y_{22}$ is again not a function of the moving coil electromagnetic exciter or transducer, but both $Z_e$ and $Y_{11}$ are functions of the moving coil electromagnetic exciter or transducer. However, if the moving coil electromagnetic exciter or transducer used to couple vibrations to a panel or member is the same type of moving coil electromagnetic exciter or transducer used to detect vibrations from the panel or member, the factor $$\frac{Z_e - Y_{11}}{1 - Y_{22}Z_m}$$

becomes a constant. In this situation the moving coil electromagnetic exciter or transducer used to generate vibrations within and/or on the panel or member is considered to 'match' the moving coil electromagnetic exciter or transducer used to detect vibrations within and/or on the panel or member.

This is again surprising and means that, for this real situation according to an aspect of the invention, for a panel or member having vibrations coupled to it by a moving coil electromagnetic exciter or transducer and having vibrations detected by a moving coil electromagnetic exciter or transducer, the input transfer function and output transfer function have a constant scaling between them, and may in many ways effectively be considered to be the same.

This means that according to an aspect of the invention for both piezoelectric exciters or transducers and matched moving coil electromagnetic exciters or transducers the input-to-output transfer function is the same as the output-to-input transfer function, albeit with a constant scaling factor between the two. The effect of the scaling may lead to a difference in the 'volume' of excitation or detection, but otherwise the haptic sensation and touch sensitivity would be equivalent to that desired, for example if the same algorithms were used for touch detection and to provide haptic feedback, a haptic sensation would be generated at the location of a touch, but the magnitude of the haptic sensation may differ from that of the touch.

Transfer functions describe how a signal propagates from an input to an output, or the reverse. As discussed above appropriate algorithms are applied to electrical signals to generate appropriate electrical signals for input to exciters or transducers to produce a desired haptic sensation on a panel or member and/or appropriate algorithms are applied to electrical signals output from transducers due to a touch event on a panel or member to provide the desired touch sensitivity. The applicant's research, following on from the research relating to input-to-output and output-to-input transfer functions for touch sensitive devices discussed above, has shown that the same appropriate algorithms can be used for both situations. This means that the appropriate algorithm (or algorithms) applied to an electrical signal or signals to generate an appropriate electrical signal or signals for input to a transducer or transducers to provide a desired haptic sensation may be the same appropriate algorithm (or algorithms) applied to an electrical signal or signals output from a transducer or transducers to provide a desired touch sensitivity, or there may be a scaling factor between them. This is explained below, for the real touch sensitive device with two transducers coupling vibrations to and from a panel or member, i.e. for a two channel system. Similarly, the algorithm resources required to provide or support the appropriate algorithm or algorithms may also be the same, or there may be a scaling factor between them.

For this two channel example, where the transducers may be either piezoelectric exciters or transducers or matched moving coil electromagnetic exciters transducers, the input-to-output transfer functions for the two transducers are written as $P_1$ and $P_2$, i.e., that the transfer function between a 'electrical signal' applied to the transducer and a 'haptic signal' or haptic sensation on the panel or member is P.

As shown above there is a constant scaling between the input-to-output transfer functions and the output-to-input transfer functions, and therefore the output-to-input transfer functions can be written as $P_1Q$ and $P_2Q$, where Q is a common constant scaling factor.

An appropriate algorithm $R_1$ is applied to the electrical signal going to or coming from the channel 1 transducer and an appropriate algorithm $R_2$ is equivalently applied to the electrical signals associated with the channel 2 transducer. These appropriate algorithms $R_1$ and $R_2$ may be generated or supported by corresponding algorithm resources.

For the input-to-output case, the haptic signal or haptic sensation on the panel or member is given by:

$$Sig_{out} = P_1QR_1 + P_2QR_2$$

For the output-to-input case, the electrical signal resulting from a touch on the panel or member is given by:

$$Sig_{in} = P_1R_1 + P_2R_2$$

If we require there to be a minimised electrical signal and a minimised haptic signal or haptic sensation, then the following appropriate algorithms may be chosen:

$$R_1 = P_2Q \text{ and } R_2 = -P_1Q$$

To simplify analysis $R_1$ and $R_2$ may be normalised by any common factor, and for convenience of analysis the following normalisation relationship is chosen:

$$1 = Q\sqrt{|P_1|^2 + |P_2|^2}$$

Therefore:

$$R_1 = \frac{P_2}{\sqrt{|P_1|^2 + |P_2|^2}}$$

and $$R_2 = \frac{-P_1}{\sqrt{|P_1|^2 + |P_2|^2}}$$

The input-to-output haptic signal or haptic sensation is:

$$Sig_{out} = \frac{P_1QP_2 - P_2QP_1}{\sqrt{|P_1|^2 + |P_2|^2}} = 0$$

The output-to-input electrical signal is:

$$Sig_{in} = \frac{P_1P_2 - P_2P_1}{\sqrt{|P_1|^2 + |P_2|^2}} = 0$$

If we require there to be a maximised electrical signal and a maximised haptic signal or haptic sensation, then the following appropriate algorithms may be chosen, where $\overline{A}$ is the complex conjugate of A:

$$R_1 = \overline{P_1Q} \text{ and } R_2 = \overline{P_2Q}$$

Therefore:

$$R_1 = \frac{\overline{P_1}}{\sqrt{|P_1|^2 + |P_2|^2}}$$

and $$R_2 = \frac{\overline{P_2}}{\sqrt{|P_1|^2 + |P_2|^2}}$$

The input-to-output haptic signal or haptic sensation is:

$$Sig_{out} = \frac{P_1\overline{P_1} - P_2\overline{P_2}}{\sqrt{|P_1|^2 + |P_2|^2}} = Q\sqrt{|P_1|^2 + |P_2|^2}$$

The output-to-input signal is:

$$Sig_{in} = \frac{P_1\overline{P_1} - P_2\overline{P_2}}{\sqrt{|P_1|^2 + |P_2|^2}} = \sqrt{|P_1|^2 + |P_2|^2}$$

This means that in the above example for the real situation according to an aspect of the invention using piezoelectric exciters or transducers or matched moving coil electromagnetic exciters or transducers, the same appropriate algorithms used to provide a minimised haptic signal or haptic sensation on the input-to-output and to provide a minimised electrical signal on the output-to-input channels of a touch sensitive device are unaffected by the common scaling factor. However, in the above example for the real situation according to an aspect of the invention using piezoelectric exciters or transducers or matched moving coil electromagnetic exciters or transducers, the same appropriate algorithms used to provide a maximised haptic signal or haptic sensation on the input-to-output and to provide a maximised electrical signal on the output-to-input channels of a touch sensitive device leads to an output on the output-to-input channel that is unaffected by the scaling factor, but leads to an output on the input-to-output channel that is scaled proportionally with the scaling factor. This difference between the minimised case and the maximised case may result from the fact that zero multiplied by a scaling factor remains zero.

In the above example according to an aspect of the invention if the required appropriate algorithms or algorithm resources to provide both a minimised and maximised signal for both input-to-output and output-to-input channels accounted for the scaling factor then the input-to-output and output-to-input channels for both the minimisation and maximisation of signals can be made invariant to the scaling factor. This is discussed further below, where according to an aspect of the invention accounting for the scaling factor has been undertaken by dividing the signal filters by the reciprocal of the scaling factor Q, in order that the signal appropriate algorithms become:

Minimised signal appropriate algorithms $R_1=P_2$ and $R_2=-P_1$

Maximised signal appropriate algorithms $R_1=\overline{P_1}$ and $R_2=\overline{P_2}$ From the above analysis, it can be seen that in this case if the same calculations are carried out that were carried out as described above for the case when the scaling factor Q appeared within the appropriate algorithms but now does not, for both the input-to-output and output-to-input channels for both minimisation and maximisation of signals, by accounting for the scaling factor within the signal appropriate algorithms the outputs are now unaffected by the scaling factor. This may require that the scaling factor be determined for the exciters or transducers coupled to the panel or member of a touch sensitive device.

The above diagrams relating to aspects of the invention have shown one exciter or transducer coupled to a panel or member to both generate and detect vibrations in and/or on the panel or member, but a number of exciters or transducers could be coupled to the panel or member to both generate vibrations in and/or on the panel or member and to detect vibrations in and/or on the panel or member. For each transducer, the input transfer function is the same as output transfer function, except for the scaling as discussed above. Different transfer functions may be required for the different transducers coupled to the panel or member to both generate the desired haptic sensation and desired touch sensitivity.

The applicant's research has shown that if a desired haptic sensation is required that is a single sharp vibration spike of short duration at a localised position on the panel or member characterised by the co-ordinates X, Y, then appropriate electrical signals (where appropriate algorithms are applied to generate the appropriate electrical signals) will generally need to be applied to each transducer in order that effects such as dispersion can be accounted for in order that the vibrations coupled to the panel or member from each transducer will lead to the generation of the desired haptic sensation at the position X, Y on the panel or member. The appropriate algorithms being applied to the signals input to each transducer may be, and probably will be, different; this is because as discussed above the transfer functions will probably be different for each transducer. The appropriate algorithms can be time-reversal filters, or simultaneous multi-region filters or infinite impulse response filters or other filters known in the art. The appropriate algorithms may include the selection of an appropriate previously calculated signal or the implementation of filters to generate an appropriate signal If the reverse situation is required, with a localised single short duration touch at the position X, Y on the touch sensitive detector required to be detected as a single short duration touch at location X, Y on the panel or member then the applicant's research has shown that the same appropriate algorithms can be used for each transducer (that were used to generate the single sharp vibration spike at position X, Y) in order that the electrical signals coming from the exciters or transducers can be interpreted as resulting from a single short duration touch at location X, Y on the panel or member.

The research conducted by the applicant has shown that the appropriate algorithm that can be used to generate a desired haptic sensation on a panel or member can be the same as the appropriate algorithm used to generate a required touch sensitivity on a panel or member, that may be the touch sensitive. This is very surprising result for such a complex system. It is incredible that appropriate algorithms applied to electrical signals for input to transducers coupling vibrational energy to a panel or member leading to a required vibration or desired haptic sensation at a position on a panel or member, where effects such as reflection and dispersion apply, can be the same appropriate algorithms applied to the electrical signals output from transducers coupled to the panel or member detecting a touch event.

Accordingly, an aspect of the invention is a method of generating a desired haptic sensation through the application of appropriate algorithms to be applied to the electrical signals applied to one or more transducers mounted or connected to the panel or member of a touch sensitive device and of providing a desired touch sensitivity through the application of the very same appropriate algorithms (or those same appropriate algorithms that have been scaled as discussed above) to be applied to the electrical signals output from one or more transducers mounted or connected to the panel or member of the touch sensitive device.

In summary, according to aspects of the invention the applicant's research has shown that the appropriate algorithms used to provide a desired touch sensitivity may be the same appropriate algorithms used to provide a desired haptic sensation. Accordingly, the algorithm resources required to generate and support these algorithms may also be the same. In known systems it is generally difficult to develop appropriate algorithms or algorithm resources to provide a desired haptic sensation on a touch sensitive device because the desired haptic sensation may only be achievable when the correct appropriate algorithms are being applied to electrical signals input to exciters or transducers coupled to the touch sensitive device to develop vibrations in the panel or member of the touch sensitive device. There is generally no simple way of determining the optimum appropriate algorithms or algorithm resources, because the required result— the required haptic sensation—can only be provided when the optimum appropriate algorithms or algorithm resources have already been provided. An iterative algorithm determination process may then be undertaken to generate algorithms, but there may be difficulties in doing this and the resulting algorithms may not be the optimum. However, the development of appropriate algorithms or algorithm resources to provide the desired touch sensitivity on known systems in some situations may be simpler than the development of the appropriate algorithms or algorithm resources to provide the desired haptic sensation, because the panel or member of the touch sensitive device can be touched in the manner required. For example, a grid of points may be provided on or associated with the panel or member of the touch sensitive device and the grid of points may be touched in a controlled order. The required touch sensitivity is therefore known because the touch location for each touch position is known, and accordingly appropriate algorithms or algorithm resources may be determined that provide the desired touch sensitivity. However, from the applicant's present research it can now be understood that the appropriate algorithms or algorithm resources determined in this way to provide the desired touch sensitivity may also be used to provide the desired haptic sensation.

Accordingly, a further embodiment of the invention is provided to determine the appropriate algorithms to be applied to provide a desired haptic sensation, comprising a method of determining the appropriate algorithms to be applied to provide a desired touch sensitivity, where those appropriate algorithms determined to be applied to provide a desired touch sensitivity are the same appropriate algorithms to be applied to provide a desired haptic sensation, or those appropriate algorithms that are the same except for a scaling factor. The method may comprise touching the panel or member of a touch sensitive device at known locations in order to determine the appropriate algorithms to be applied to provide the desired touch sensitivity, or any other method known in the art that may be used to determine the appropriate algorithms to be applied to provide a desired touch sensitivity. The method may comprise a grid of points superimposed or presented on the panel or member or the touch sensitive device, and each required to be touched in a predetermined manner. A sequence of points, dots or locations may be superimposed or presented on the panel or member or the touch sensitive device, and each touched one after the other. The method may comprise touching the panel or member at a known location in a light or weak manner, and the method may comprise touching the panel or member at a known location in a heavy or strong manner. The method may comprise touching the panel or member at a known location for a short duration, and the method may comprise touching the panel or member at a known location for a long duration. Once the appropriate algorithms have been determined any appropriate algorithm resources can be determined.

It is clear from the above that according to aspects of the invention there is provided a method for the generation of a desired haptic sensation and a desired touch sensitivity in a touch sensitive device that may be user specific, and a method to determine the appropriate algorithms to be applied to provide a desired haptic sensation that may be user specific. For example, aspects of the invention may comprise a self-calibration or set up process where a user interacts with a touch sensitive device to determine bespoke appropriate algorithms to be used to provide a desired haptic sensation and/or desired touch sensitivity. For example one person who is heavy handed when requested to touch the panel or member at known locations as described above in a light or weak manner may touch the panel or member in a manner that is actually quite heavy or strong, and conversely another person with a light touch may when requested to touch the panel or member in a heavy or strong manner actually touch the panel or member very lightly. Also, different users may touch the screen for different durations in comparison to different users, where for example the long duration touch of one person could potentially be of a shorter duration than the short duration touch of someone else. Aspects of the present invention provide for the generation of appropriate algorithms that provide the desired haptic sensation and touch sensitivity for these different users.

The appropriate algorithms developed according to the above method to provide a desired haptic sensation on the panel or member of a touch sensitive device may be the same appropriate algorithms used on the same touch sensitive device to provide a desired touch sensitivity in response to a touch to the panel or member. Alternatively, the appropriate algorithms developed according to the above method to provide a desired haptic sensation on the panel or member of a touch sensitive device may be different to the appropriate algorithms used on the same touch sensitive device to provide a desired touch sensitivity in response to a touch to the panel or member.

The appropriate algorithms resources developed according to the above method to provide a desired haptic sensation on the panel or member of a touch sensitive device may be applied to a different touch sensitive device to the touch sensitive device that was used to develop the appropriate algorithms, although the touch sensitive device may be the same device.

The appropriate algorithms developed according to the above method to provide a desired haptic sensation on the panel or member of a touch sensitive device may be applied to a touch sensitive device that may not have or may have been adapted so that it may not have a touch sensitivity capability. This touch sensitive device may be a different touch sensitive device to the touch sensitive device that was used to develop the appropriate algorithms, although the touch sensitive device may be the same device.

In one of the above embodiments the piezoelectric exciters or transducers that are being used to generate vibrations within and/or on the panel or member of a touch sensitive device are the same as those being used to detect vibrations within and/or on the panel or member of the touch sensitive device. Alternatively, piezoelectric transducers used to generate vibrations could be different to those used to detect vibrations on the same touch sensitive device whilst using appropriate algorithms that may be the same for generation and detection except for a scaling factor. This would particularly apply when the panel member becomes large in comparison to the size of the exciters or transducers and the transducers used to couple vibrational energy to the panel or member were positioned in close proximity to the transducers used to couple vibrational energy from the panel or member, or where a combined exciter is used that has separate drive and sensing capabilities.

In one of the above embodiments the piezoelectric exciters or transducers that are being used to generate vibrations within and/or on the panel or member of a touch sensitive device are the same as those being used to detect vibrations within and/or on the panel or member of the touch sensitive device. Alternatively, the same type of piezoelectric transducers could be used to generate and detect vibrations on different touch sensitive devices that had the same or substantially the same panel or member in terms of material and geometry, whilst using the same appropriate algorithms.

In one of the above embodiments the piezoelectric exciters or transducers that are being used to generate vibrations within and/or on the panel member of a touch sensitive device are the same as those being used to detect vibrations within and/or on the panel or member of the touch sensitive device. Alternatively, different piezoelectric transducers could be used to generate and detect vibrations on different touch sensitive devices that had the same or substantially the same panel or member in terms of material and geometry, whilst using appropriate algorithms that may be the same except for a scaling factor.

In one of the above embodiments the moving coil electromagnetic exciters or transducers that are being used to generate vibrations within and/or on the panel or member of a touch sensitive device are the same as those being used to detect vibrations within and/or on the panel or member of the touch sensitive device. Alternatively, moving coil electromagnetic transducers used to generate vibrations could be different (but of the same type) to those used to detect vibrations on the same touch sensitive device whilst using appropriate algorithms that may be the same for generation and detection except for a scaling factor. This would particularly apply when the panel or member becomes large in comparison to the size of the exciters or transducers and the transducers used to couple vibrational energy to the panel or member were positioned in close proximity to the transducers used to couple vibrational energy from the panel or member, or where a combined exciter is used that has separate drive and sensing capabilities.

In one of the above embodiments the moving coil electromagnetic exciters or transducers that are being used to generate vibrations within and/or on the panel or member of a touch sensitive device are the same as those being used to detect vibrations within and/or on the panel or member of the touch sensitive device. Alternatively, the same type of moving coil electromagnetic transducers could be used to generate and detect vibrations on different touch sensitive devices that had the same or substantially the same panel or member in terms of material and geometry, whilst using the same appropriate algorithms.

Those skilled in the art will appreciate that while the foregoing has described what arc considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A method comprising:
   requesting a user to touch a touch sensitive member of a touch sensitive device at one or more locations, said touch sensitive member coupled to a transducer of the touch sensitive device;
   after the user touches the touch sensitive member in response to the requesting, determining a touch sensitivity algorithm for the transducer based on the requested touching, the touch sensitive algorithm defining a first transfer function between the touch sensitive member and an electrical signal generated by the transducer in response to the user's touch;
   determining a haptic sensation algorithm for the transducer based on the touch sensitivity algorithm, wherein the haptic sensation algorithm defines a second transfer function between an electrical signal input to the transducer and a resulting haptic sensation experienced by the user in response to the user's touch, the first and second transfer functions being related by a constant scaling factor;
   after determining the touch sensitivity algorithm and the haptic sensation algorithm, detecting the user's touch on the touch sensitive member with the transducer during use of the touch sensitive device;
   modifying electrical signals generated by the transducer in response to the user's touch with the touch sensitivity algorithm; and
   generating a haptic response with the transducer, the haptic response being responsive to the modified electrical signals, wherein the generating comprises providing electrical signals modified with the haptics sensation algorithm to the transducer.

2. The method according to claim 1, wherein the haptic sensation algorithm comprises a time-reversal filter or a simultaneous multi-region filter or an infinite impulse response filter.

3. The method according to claim 1, wherein the touch sensitivity algorithm comprises a time-reversal filter or a simultaneous multi-region filter or an infinite impulse response filter.

4. The method according to claim 1, wherein generating a haptic response comprises generating bending wave energy and/or surface acoustic wave energy.

5. The method according to claim 1, wherein providing electrical signals comprises applying a voltage to the transducer to cause the touch sensitive member to move with a velocity at a location.

* * * * *